United States Patent [19]

Ishii et al.

[11] Patent Number: 5,552,840
[45] Date of Patent: Sep. 3, 1996

[54] THREE DIMENSIONAL PROJECTION DISPLAY REFLECTING DIVIDED POLARIZED LIGHT ON TO REFLECTIVE LIQUID CRYSTAL DISPLAY ELEMENTS

[75] Inventors: Yutaka Ishii, Nara; Yoshitaka Yamamoto, Yamatokoriyama, both of Japan

[73] Assignee: Sharp Kabushiki Kaisha, Osaka, Japan

[21] Appl. No.: 31,175

[22] Filed: Mar. 11, 1993

[30] Foreign Application Priority Data

Mar. 13, 1992 [JP] Japan .................................. 4-055726

[51] Int. Cl.⁶ .................................................. H04N 5/74
[52] U.S. Cl. .......................... 348/751; 348/58; 348/742; 348/790; 354/112; 359/465
[58] Field of Search ........................... 348/58, 742, 743, 348/70, 751, 752, 790, 53, 42, 51, 58; 359/465, 490, 495, 40, 63; 354/112–117; H04N 5/74, 9/31, 13/04

[56] References Cited

U.S. PATENT DOCUMENTS

| | | | |
|---|---|---|---|
| 4,647,966 | 3/1987 | Phillips et al. | 358/88 |
| 4,786,146 | 11/1988 | Ledebuhr | 348/742 |
| 4,995,718 | 2/1991 | Jachimowicz et al. | 348/58 X |
| 5,028,121 | 7/1991 | Bauer et al. | 350/331 |
| 5,239,372 | 8/1993 | Lipton | 348/58 |
| 5,357,277 | 10/1994 | Nakayoshi et al. | 348/53 |

FOREIGN PATENT DOCUMENTS

| | | |
|---|---|---|
| 0083440 | 7/1983 | European Pat. Off. . |
| 62-250425 | 10/1987 | Japan . |
| 3152526 | 6/1991 | Japan . |

OTHER PUBLICATIONS

S. Yano et al., *Japan Display 89*, pp. 48–51 4–3 "A Study of Picture Quality for Stereoscopic Pictures and Two–dimensional Pictures".

Primary Examiner—Safet Metjahic
Assistant Examiner—Cheryl Cohen
Attorney, Agent, or Firm—David G. Conlin; Kevin J. Fournier

[57] ABSTRACT

The present invention relates to a projection type liquid crystal display. In a preferred aspect, the projection type liquid crystal display of the invention includes an optical source for generating light, a light dividing unit which divides the light into a first light having a first polarization direction and a second polarization direction and allows the first and second lights to come out in different directions from each other, a pair of reflective liquid crystal display elements formed of a first reflective liquid crystal display element and a second reflective liquid crystal display element with synchronization, a light synthesizing unit for receiving the first light which comes out of the first reflective liquid crystal display element and the second light which comes out of the second reflective liquid crystal display element and synthesizing the first and second lights into image light, and a screen.

20 Claims, 11 Drawing Sheets

THREE DIMENSIONAL PROJECTION DISPLAY REFLECTING DIVIDED POLARIZED LIGHT ON TO REFLECTIVE LIQUID CRYSTAL DISPLAY ELEMENTS

BACKGROUND OF THE INVENTION

1. Field of the Invention

The present invention relates to a projection type liquid crystal display which is provided in audio visual (AV) equipment, office automation (OA) equipment, computers, etc.

2. Description of the Related Art

In recent years, with the development of advanced information society, there has been a great demand for a display having a large size as well as a large display capacity. In order to meet the demand, high precision has been advanced in a cathode ray tube (CRT) called "A Kind of a Display". In addition, in order to achieve the enlargement of the display, a direct vision type CRT with a size of 40 inches and a projection type CRT with a size of 20 inches have been developed. However, there arise problems to be solved, involving weight, and depth of the CRT along with the relaxation of the display with a large size and a large capacity.

A flat display is used for a word processor, a personal computer, etc. The flat display performs a display using a principle different from that of the CRT. Regarding the flat display, a display with high quality has been studied, which is required in a display with high vision and used for high performance engineering work stations (EWS).

Examples of the flat display include an electroluminescence panel (ELP), a plasma display panel (PDP), a vacuum fluorescent display (VFD), an electrochromic display (ECD), and a liquid crystal display (LCD). Among these flat displays, the LCD is considered to be most useful because of easiness of a full-color display and matching with a large scale integrated circuit (LSI). Thus, the LCD has been remarkably developed.

There are two kinds of LCDs: a simple matrix drive LCD and an active matrix drive LCD. The simple matrix drive LCD has a structure in which liquid crystal is sealed in an XY matrix panel, and performs a display taking advantage of the rapid response property of the liquid crystal. The XY matrix panel is obtained by disposing a pair of glass substrates so as to face each other, each glass substrate having electrodes formed in a stripe shape so that the electrodes formed on one substrate cross those formed on the other substrate. The active matrix drive LCD has a structure in which non-linear elements are directly added to pixels, and performs a display positively taking advantage of the non-linear properties (e.g., switching property) of each element. Thus, the active matrix drive LCD is less dependent upon the display property of liquid crystal itself, compared to that of the simple matrix drive LCD, and thus it enables it to create displays with high contrast and high-speed response. The non-linear element has two types: a two-terminal type and a three-terminal type. Examples of the two-terminal non-linear element include a metal-insulator-metal (MIM) and a diode. Examples of the three-terminal non-linear element include a thin film transistor (TFT), a silicon metal oxide semiconductor (Si-MOS), and a silicon-on-sapphire (SOS).

In recent years, the projection type LCD has been actively developed so as to meet the demand for more powerful images. In particular, in order to obtain an image with high quality, the projection type display such as an active matrix drive LCD has been studied and marketed positively.

Figure 9:
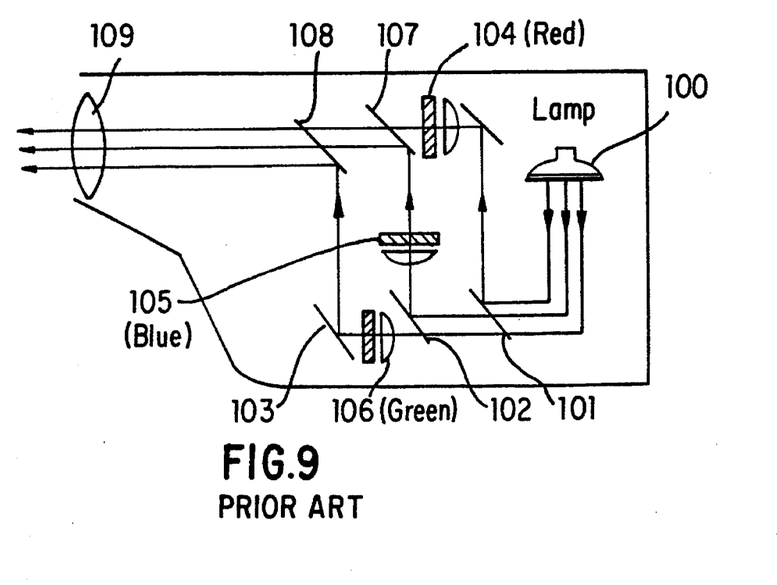
FIG. 9 is a schematic view showing a conventional projection type liquid crystal display.

FIG. 9 shows a typical example of the reflective LCD. In this reflective LCD, white light emitted from a lamp 100 is divided into red, green, and blue components by dichroic mirrors 101, 102, and 103. Lights with the respective color components are transmitted through liquid crystal panels 104, 105, and 106 for each color and synthesized to as to be an image by dichroic mirrors 107 and 108. The synthesized image is magnified by a lens 109 so as to be projected with color on a front face or a back face of a large screen (not shown).

However, the LCD shown in FIG. 9 has a problem of its large size. In order to avoid the enlargement of the LCD, it is required that the liquid crystal panels 104, 105, and 106 are made small, and optical components such as the lamp 100, the mirror 101, 102, 103, 107, and 108 and the lens 109 are made small so as to correspond to the miniaturized liquid crystal panels 104, 105, and 106, whereby the whole optical system is miniaturized. Along with the miniaturization of the optical components, it is also required to provide the optical components with high magnification. Moreover, in order to avoid a decrease in image quality caused by magnifying an image with high magnification, it is required to provide the liquid crystal panels with a high resolution.

Figure 10:
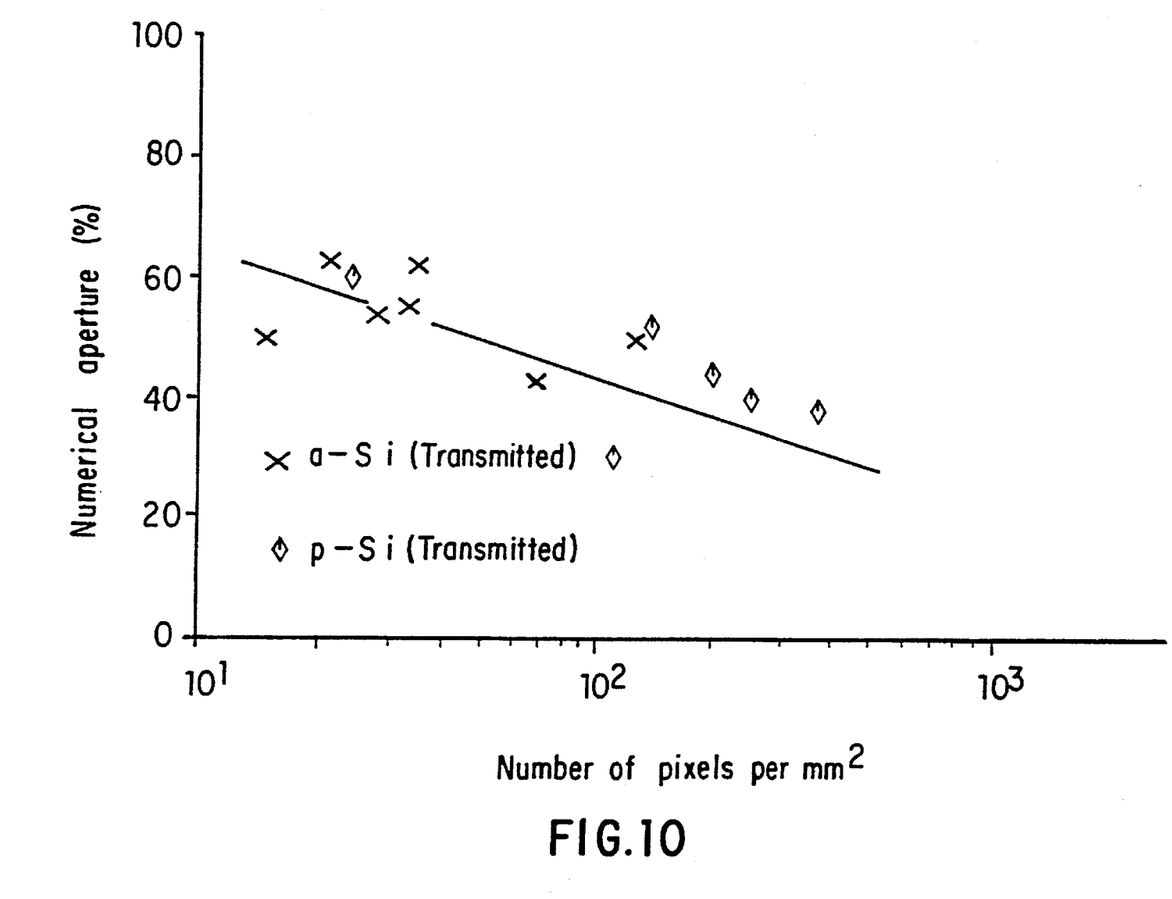
FIG. 10 is a graph showing the relationship between the number of pixels and the numerical aperture.

FIG. 10 shows the relationship between the number of pixels and the numerical aperture of a current TFT-LCD. As the number of pixels increases, an LCD will have a higher resolution. As shown in FIG. 10, the numerical aperture is decreased as the resolution is increased, resulting in a dark display. In addition, in the case where the liquid crystal panels are miniaturized under the condition that the display capacity (an area which substantially contributes to a display) is constant, similar problems will arise. Moreover, as shown in FIG. 9, the conventional projection type LCD has a structure in which an optical system for color division and an optical system for color synthesis are separately disposed, so that the length of an optical path for performing the color division and color synthesis prevents the miniaturization of the LCD.

Figure 11:
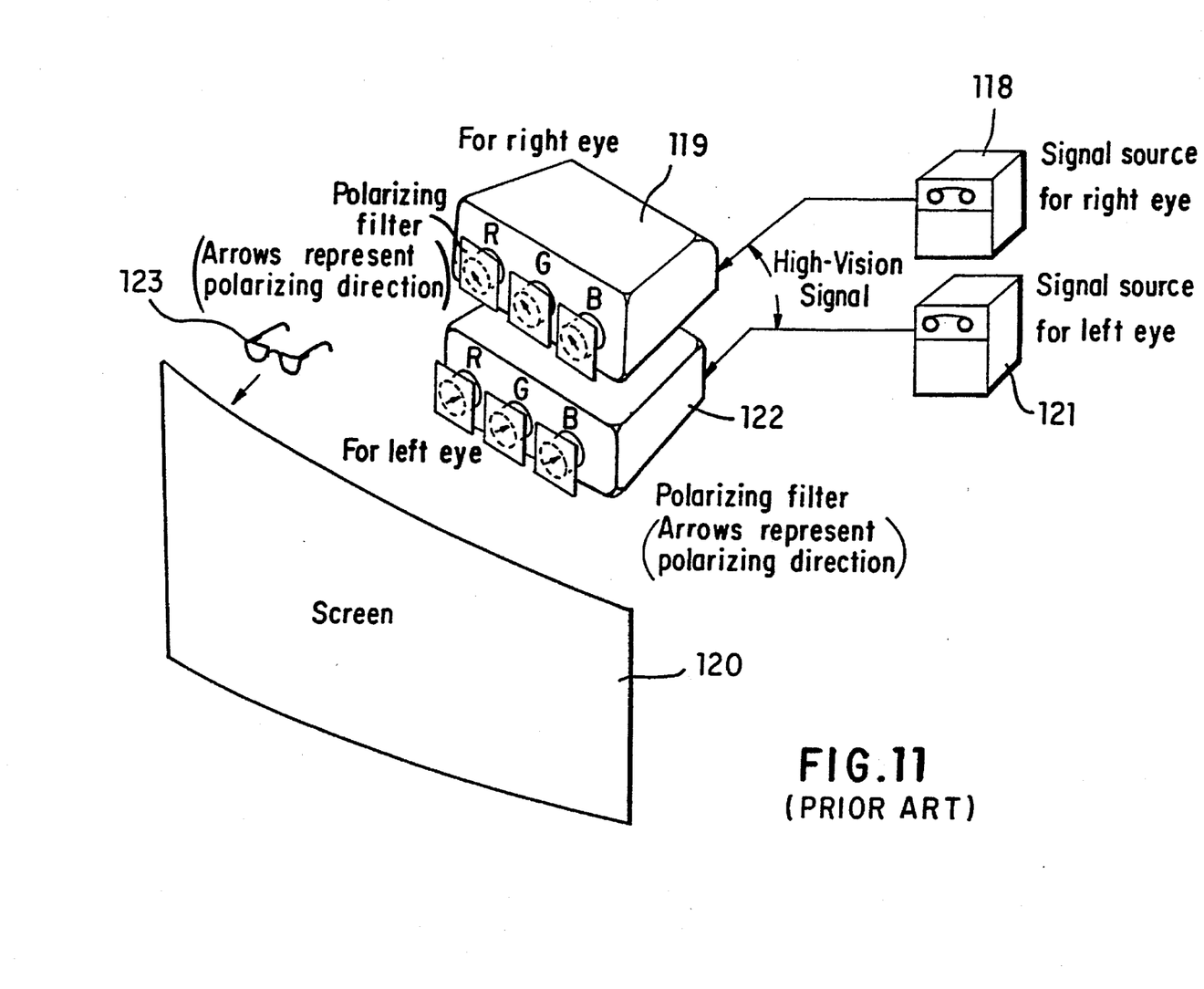
FIG. 11 is a schematic diagram showing a conventional three-dimensional display system.

There is a strong demand for a three-dimensional projection type display. A system shown in FIG. 11 has conventionally been proposed in order to realize a three-dimensional display (S. Yano and I. Yuyama; Japan Display '89 p. 48). In the system of FIG. 11, a high-vision signal emitted from a signal source 118 for a right eye is given to a CRT 119 for a right eye equipped with a polarizing filter, and an image formed in the CRT 119 is projected on a screen 120. A high-vision signal emitted from a signal source 121 and a left eye is given to a CRT 122 for a left eye equipped with a polarizing filter, and an image formed in the CRT 122 is projected on the screen 120. In this case, light components of the images for a right eye and a left eye are polarized, and the polarization directions of the respective images are shifted by 90°. A viewer watches an image displayed on the screen 120, wearing polarizing eye-glasses 123, the respective glasses having the polarization directions shifted by 90°, whereby the viewer can watch the image three-dimensionally. However, in this system, there is a problem in that the formation of an image is adversely influenced by geomagnetism because of the use of the CRT with high precision. Moreover, the system includes two CRTs 119 and 122 and the screen 120, so that the system is hardly miniaturized.

The three-dimensional display is also made possible in the following manner:

1) Two projection type LCDs (as shown in FIG. 9) for a right eye and a left eye are used; and 2) Three liquid crystal panels for displaying an image for a right eye and three liquid crystal panels for displaying an image for a left eye are disposed in one box.

However, it is difficult to miniaturize the display.

SUMMARY OF THE INVENTION

The projection type liquid crystal display of this invention, includes:

an optical source for generating light;

a light dividing unit which divides the light into a first light having a first polarization direction and a second light having a second polarization direction, and allows the first and second lights to come out in different directions from each other;

a pair of reflective liquid crystal display elements formed of a first reflective liquid crystal display element and a second reflective liquid crystal element, each of the pair of reflective liquid crystal display elements including a pair of substrates facing each other and liquid crystal sealed between the pair of substrates, the first reflective liquid crystal display element changing the first polarization direction of the first light by the liquid crystal sealed therein to allow the first light to come out thereof, and the second reflective liquid crystal display element changing the second polarization direction of the second light by the liquid crystal sealed therein to allow the second light to come out thereof;

a driving circuit for driving the first reflective liquid crystal display element and the second reflective liquid crystal display element with synchronization;

a light synthesizing unit for receiving the first light which comes out of the first reflective liquid crystal display element and the second light which comes out of the second reflective liquid crystal display element, and synthesizing the first and second lights into image light; and a screen on which the image light is displayed.

According to the present invention, light emitted from the optical source is incident upon the light dividing unit and the incident light is divided into an S-polarized light and a P-polarized light. The light dividing unit reflects the S-polarized light on a slope thereof, and allows the P-polarized light to be transmitted therethrough, whereby the incident light is divided. The light dividing unit functions as the light synthesizing unit, so that the respective images displayed on the first and second reflective liquid crystal display elements are combined by the light dividing unit (light synthesizing unit). Thus, one of the divided lights by the light dividing unit is reflected from the first reflective liquid crystal display element and is incident upon the light dividing unit again. The polarization direction of light is changed by the liquid crystal, so that the light reflected from the first reflective liquid crystal display element contains a P-polarized light (i.e., light which is optically modulated by the liquid crystal) and an S-polarized light (i.e., light which is not optically modulated by the liquid). The S-polarized light among the lights reflected from the first reflective liquid crystal display element proceeds to the optical source, and the P-polarized light passes through the slope of the light dividing unit to the screen.

The other light of the divided light is reflected from the second reflective liquid crystal display element and returns to the light dividing unit. The light which returns to the light dividing unit contains a P-polarized light (i.e., light which is not optically modulated by the liquid crystal) and an S-polarized light (i.e., light which is optically modulated by the liquid crystal). The P-polarized light among the lights reflected from the second reflective liquid crystal display element proceeds to the optical source and the S-polarized light is reflected from the slope of the light dividing unit to proceed to the screen. At this time, the driving circuit synchronizes the first and second reflective liquid crystal display elements, thereby allowing images to be displayed. Thus, a combined image can be formed on the screen.

According to the projection type liquid crystal display, an image to be formed on one of the reflective liquid crystal display elements is taken as an image for a right eye and an image to be formed on the other reflective liquid crystal display element is taken as an image for a left eye. A three-dimensional image formed of the images for right and left eyes is caught by the eyeglasses, whereby a viewer can watch an object and the like three-dimensionally. Moreover, in the case where identical images are formed on the two reflective liquid crystal display elements, a remarkably bright non-three-dimensional image can be formed.

Thus, the invention described herein makes possible the advantages of (1) providing a projection type liquid crystal display capable of performing a non-three-dimensional display as well as a three-dimensional display; (2) providing a projection type liquid crystal display in which the formation of an image is not adversely influenced by geomagnetism; and (3) providing a miniaturized projection type liquid crystal display with high resolution.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating an example with reference to the drawings.

EXAMPLE

Figure 1:
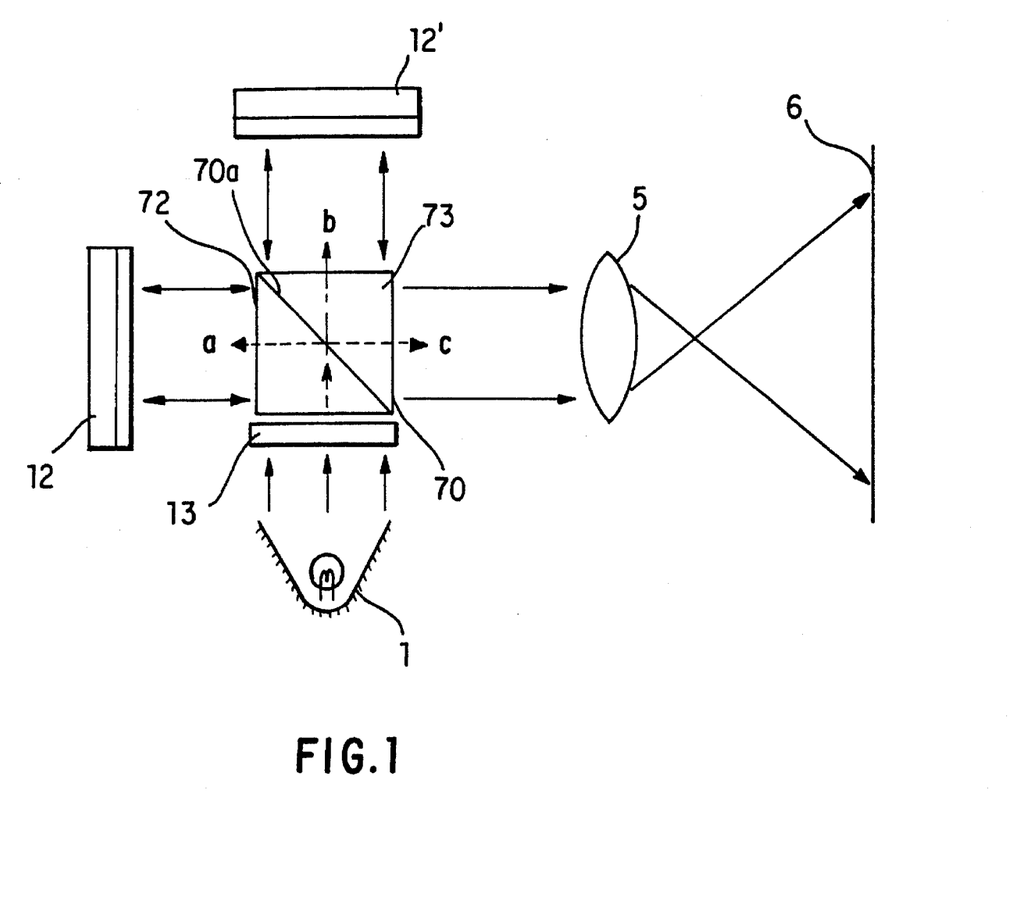
FIG. 1 is a schematic view showing a projection type liquid crystal display according to the present invention.
Figure 2A:
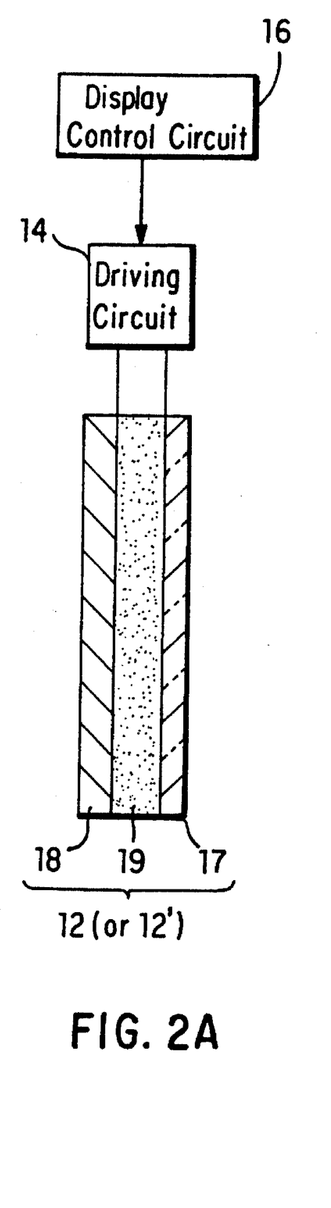
FIG. 2a is a cross-sectional view of a liquid crystal display element together with an electrical circuit.

FIG. 1 shows a projection type liquid crystal display of the present example capable of performing a color display. The display of the present example includes an optical source 1, a light selection unit 13, a beam splitter 70, first and second reflective liquid crystal display elements 12 and 12', an optical system, and a screen 6. The optical source 1 emits, for example, white light. The white light is incident upon the light selection unit 13, where the light is formed into three primary colors. The beam splitter 70 divides the light transmitted through the light selection unit 13 into two polarized lights a and b. The two polarized lights a and b come out of the beam splitter 70, having different polarization directions. The first and second reflective liquid crystal display elements 12 and 12' are provided in each optical path of the polarized lights a and b, and are regulated by a display control circuit 16 and driving circuits 14 (shown in FIG. 2). The optical system is constituted by the beam splitter 70 and a lens 5 disposed on the right side of the beam splitter 70. Light with respect to respective images formed on the first and second reflective liquid crystal display elements 12 and 12' comes out through the beam splitter 70 in a direction of c, and light c is magnified by the lens 5 so as to be projected on the screen 6.

The operation of the display shown in FIG. 1 is as follows:

The white light emitted from the optical source 1 passes through the light selection unit 13 and is incident upon the beam splitter 70. Part of the light incident upon the beam splitter 70 is reflected from a slope 70a of the beam splitter 70 so as to become light a (S-polarized light). The remaining part of the light passes through the slope 70a to become light b (P-polarized light).

The lights a and b are incident upon the reflective liquid crystal display elements 12 and 12', respectively. Among the lights reflected from the reflective liquid crystal display elements 12 and 12', optically modulated light, i.e., lights having image information travel in the opposite directions of the incidence directions of the lights a and b. These lights are again incident upon the beam splitter 70 so as to be combined. The light c (i.e., the optically modulated and combined light) is magnified by the lens 5 in order to be projected on the screen 6.

In the projection type liquid crystal display which functions as described above, in the case where an image for a right eye and an image for a left eye are formed on the reflective liquid crystal display elements 12 and 12', a three-dimensional display can be performed; and in the case where the identical images are formed on the reflective liquid crystal display elements 12 and 12', non-three-dimensional display can be performed. Regarding the three-dimensional display, it is required that an image formed on the screen 6 is caught by polarizing eyeglasses (not shown). Regarding the non-three-dimensional display, it is not required to use polarizing eyeglasses. Moreover, the projection type liquid crystal display of the present invention can be used as a front type display or a rear type display. In the case of the front type display, an image is projected on the front side of the screen 6 (i.e., on the side where the viewer is positioned). In the case of the rear type display, in image is projected on the back side of the screen 6 (i.e., on the side opposite the viewer's position with respect to the screen 6). Furthermore, in the case of the rear type display, if the screen 6 is provided with a lenticular lens in a rectangular shape, a three-dimensional display can be shown without polarizing eyeglasses.

Hereinafter, each component will be described in detail.

Light Selection Unit 13

Figure 2B:
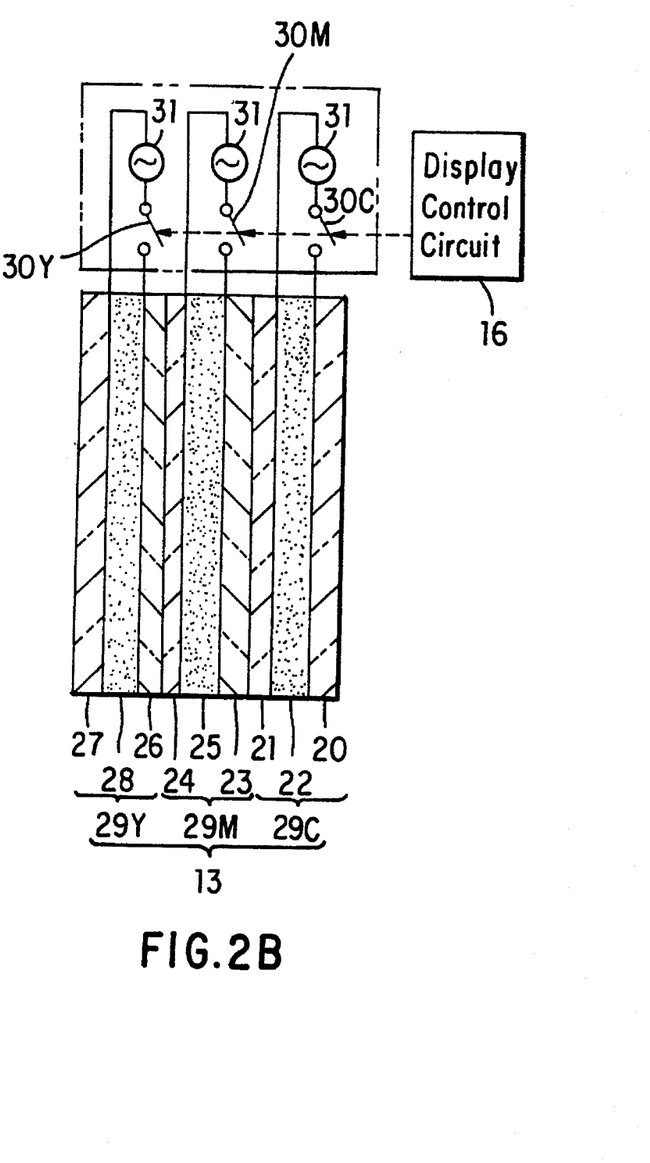
FIG. 2b is a cross-sectional view of a light selection unit together with an electrical circuit.

The light selection unit 13 is shown in FIG. 2b. The light selection unit 13 provides the images formed on the reflective liquid crystal display elements 12 and 12' with color. The light selection unit 13 is disposed on the side of a transparent substrate 17 of the reflective liquid crystal display element 12, and is formed of a cyan filter 29C, a magenta filter 29M, and a yellow filter 29Y, which are layered in that order. The cyan filter 29C includes a pair of transparent substrates 20 and 21 facing each other, and a transparent electrode (not shown) is formed on each inside surface of the transparent substrates 20 and 21. Liquid crystal 22 containing a cyan dichroic dye (described later) is inserted between the transparent substrates 20 and 21. The magenta filter 29M includes a pair of transparent substrates 23 and 24 facing each other, and a transparent electrode (not shown) is formed on each inside surface of the transparent substrates 23 and 24. Liquid crystal 25 containing a magenta dichroic dye (described later) is inserted between the transparent substrates 23 and 24. The yellow filter 29Y includes a pair of transparent substrates 26 and 27 facing each other, and a transparent electrode (not shown) is formed on each inside surface of the transparent substrates 26 and 27. Liquid crystal 28 containing a yellow dichroic dye (described later) is inserted between the transparent substrates 26 and 27.

The cyan filter 29C, the magenta filter 29M, and the yellow filter 29Y are applied with an AC voltage from AC power sources 31 via switching circuits 30C, 30M, and 30Y, respectively. The switching circuits 30C, 30M, and 30Y selectively apply an AC voltage to the cyan filter 29C, the magenta filter 29M, and the yellow filter 29Y based on a switching signal from the display control circuit 16, thereby driving each filter. As described above, the on/off of each filter is regulated, whereby light with either one of three primary colors, i.e., red, green, or blue can be incident upon the reflective liquid crystal display elements 12 and 12'. The following Table 1 shows the relationship between the state of each driven filter and the color of the incident light.

TABLE 1

| Drive state | | | |
|---|---|---|---|
| 29 C | 29 M | 29 Y | Color of incident light |
| ON | OFF | OFF | Red |
| OFF | ON | OFF | Green |
| OFF | OFF | ON | Blue |

Figure 3:
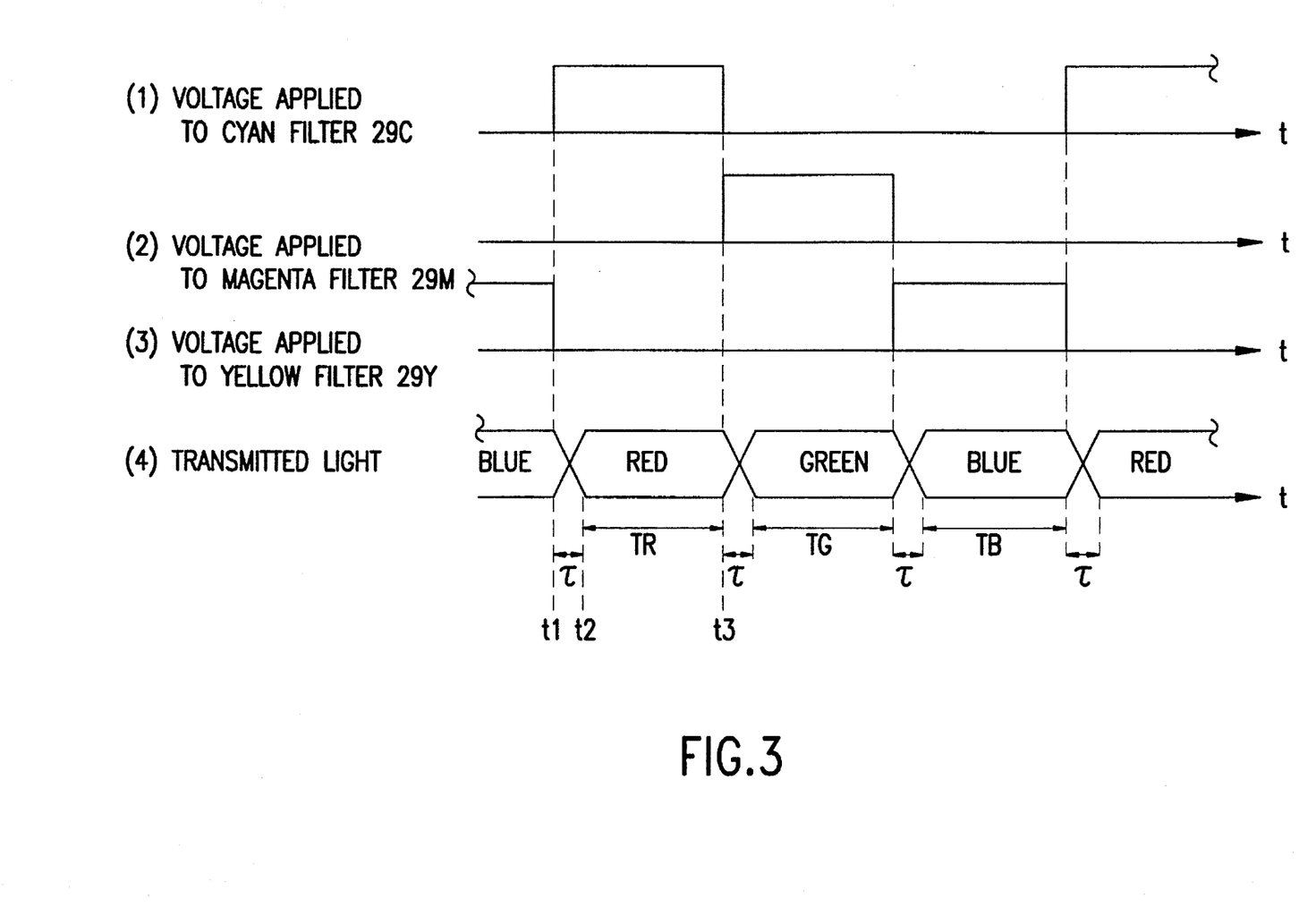
FIG. 3 is a timing chart regarding an applied voltage together with the kind of transmitted light.

FIG. 3 is a timing chart showing the fundamental operation of the light selection unit 13. The cyan filter 29C is applied with a voltage from $t_1$ to $t_3$. The orientation of liquid crystal molecules are not immediately changed by being applied with a voltage and a predetermined transition period $\tau$ is required. The transition period $\tau$ corresponds to a response recovery speed of the liquid crystal molecules with respect to an electrical field. Thus, even though the application of the voltage starts at $t_1$, it is not until $t_2$ that liquid crystal molecules in the cyan filter 29C actually respond to the voltage, and the orientation thereof becomes stable. Accordingly, the light transmitted through the light selection unit 13 becomes red during TR (from $t_2$ to $t_3$).

Figure 4:
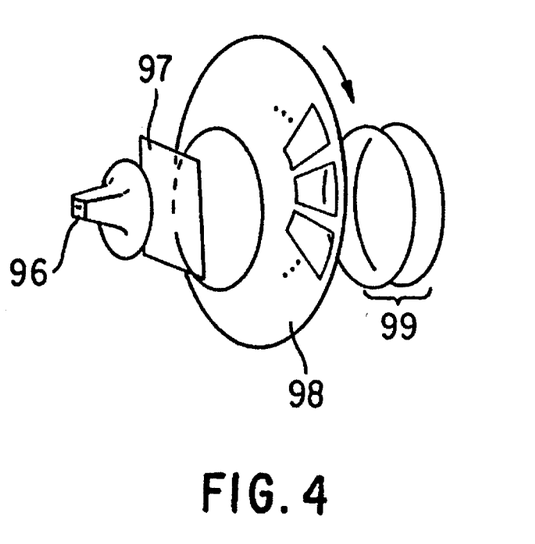
FIG. 4 is a perspective view showing a mechanical R.G.B. rotary filter.

In the same way as the above, a voltage is repeatedly applied to the magenta filter 29M, the yellow filter 29Y, and the cyan filter 29C, respectively in this order, whereby each light transmitted through the light selection unit 13 becomes green, blue, and red. The structure of the light selection unit 13 is not limited to the present example. The light selection unit 13 can be formed using three kinds of liquid crystals containing red, blue, and green dichroic dyes. Moreover, as long as any color can be converted to a desired one at high speed, any structure is applicable: e.g., a laminate of color polarizing plates and liquid crystal panels; a laminate of neutral gray polarizing plates and liquid crystal panels; and a mechanical rotary filter as shown in FIG. 4. According to the mechanical rotary filter shown in FIG. 4, light emitted from an optical source 96 is transmitted through a UV-cut filter 97, whereby the UV-rays are removed. The light from which the UV-rays are removed is transmitted through a mechanical R.G.B. rotary filter 98 so as to be colored light, and the resulting light is transmitted through a lens 99.

The position of the light selection unit 13 is not limited to a place between the optical source 1 and the beam splitter 70. The light selection unit 13 can be disposed at any position between the optical source 1 and the lens 5. In the case where the light selection unit 13 is disposed between the liquid crystal display elements 12 and 12' and the beam splitter 70, two light selection units are required for the respective liquid crystal display elements 12 and 12'.

Figure 12:
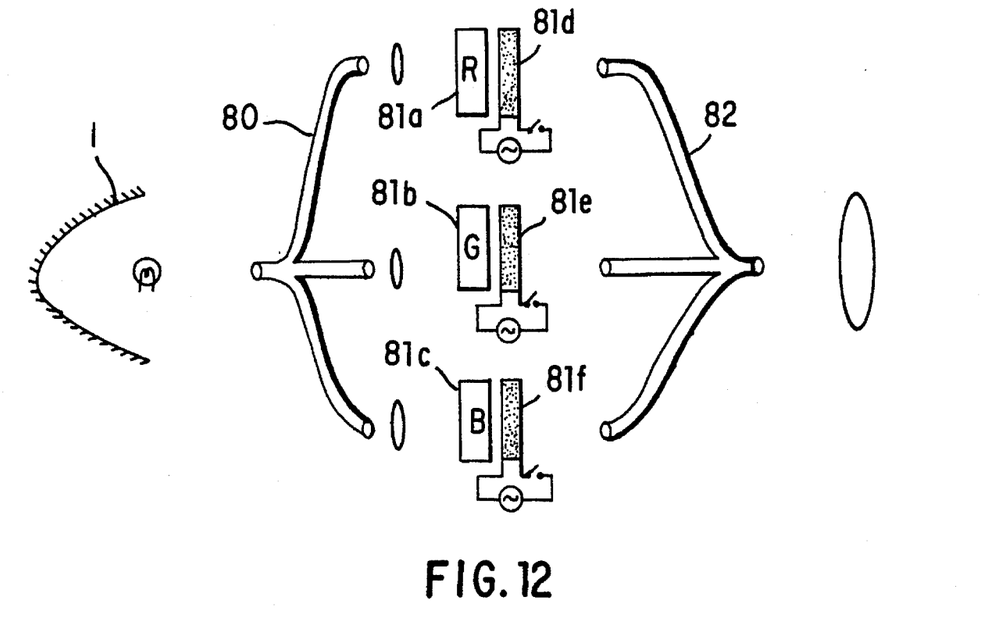
FIG. 12 is a view showing another example of a light selection unit applicable to the present invention.

Another example of the light selection unit 13 is shown in FIG. 12. An optical fiber 80 which divides light into three components is provided on the light emitting side of an optical source 1. Light converged by the fiber 80 is divided into three components. An optical system, e.g., another optical fiber 82 is provided so as to sandwich a light shutter between the optical fibers 80 and 82. The light shutter is formed of color filters 81a, 81b, and 81c; and light switching elements 81d, 81e, and 81f for each component. The optical system 82 synthesizes lights transmitted through the light shutter. Examples of the color filters 81a, 81b, and 81c include color filters using a dye or a pigment; and interference filters in which inorganic or organic optical thin films are layered. Examples of a material for the light switching elements 81d, 81e, and 81f include ceramics such as liquid crystal and PLZT. As the liquid crystal used for the light switching elements 81d, 81e, and 81f, liquid crystal with the following general display modes are applicable: a dispersion type display mode, an optical rotation type display mode, a double refraction type display mode, and a light absorption type display mode. Particularly, in the case where a high-speed response is required, the use of polymer dispersion type liquid crystal, phase transition liquid crystal, ferroelectric liquid crystal, antiferroelectric liquid crystal, or the like is desired.

Figure 13:
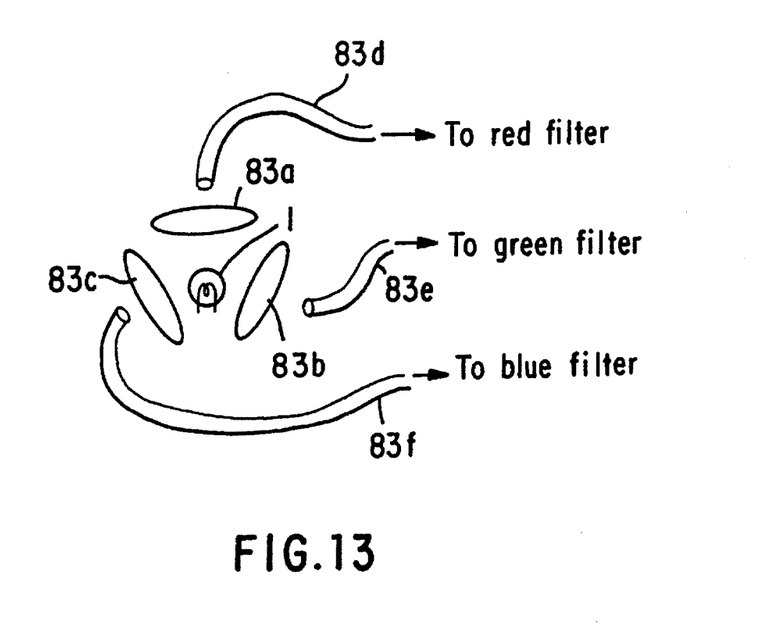
FIG. 13 is a view showing still another example of a light selection unit applicable to the present invention.
Figure 14:
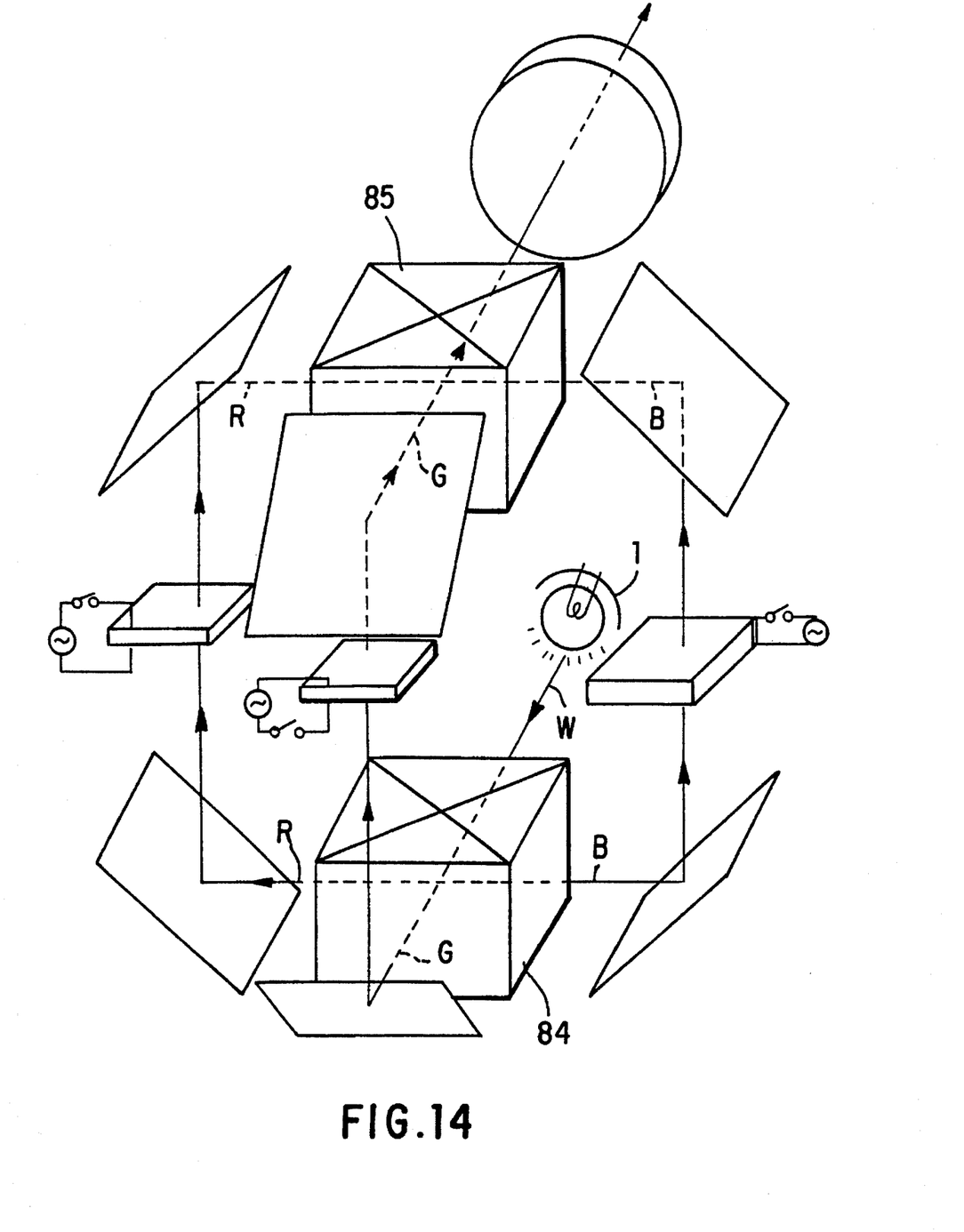
FIG. 14 is a view showing still another example of a light selection unit applicable to the present invention.

Another methods can be used for dividing light. For example, as shown in FIG. 13, light is taken out of an optical source 1 as three components by using three lenses 83a, 83b, and 83c; and fibers 83d, 83e, and 83f. Alternatively, lights are separately introduced into filters from three optical sources (not shown). Alternatively, as shown in the lower part of FIG. 14, an optical source 1 and a beam splitter 84 (or a plurality of dichroic mirrors) are combined. For synthesizing light, as shown in the upper part of FIG. 14, a beam splitter 85 (or a plurality of dichroic mirrors) is used.

Beam Splitter 70

The beam splitter 70 is formed of two prisms 72 and 73. The two prisms 72 and 73 are combined so that the respective slopes face each other. The beam splitter 70 divides non-polarized light which is incident upon the slope 70a thereof into the S-polarized light a and the P-polarized light b. The S-polarized light a comes out of the beam splitter 70 into the reflective liquid crystal display element 12, and the P-polarized light b comes out of the beam splitter 70 into the reflective liquid crystal display element 12'. The beam splitter 70 allows the S-polarized light a which is reflected from the liquid crystal display element 12 to be transmitted therethrough, and reflects the P-polarized light b which is reflected from the reflective liquid crystal display element 12' on the slope 70a, whereby the polarized lights a and b come out of the beam splitter 70 under the condition of being combined.

The optical member which functions as described above is not limited to the beam splitter 70. Any optical member, which divides non-polarized light into S-polarized light and P-polarized light, and which allows both polarized lights reflected from the liquid crystal display elements 12 and 12' (i.e., polarized lights having image information) to come out of the optical member under the condition that both polarized lights are combined, can be used. For example, the combination of a plurality dichroic mirrors can be used. It is noted that the use of the beam splitter 70 reduces the number of members and thus contributes to the miniaturization of the device.

Reflective Liquid Crystal Display Elements 12 and 12')

The reflective liquid crystal display elements 12 and 12' have the same structure. The structure of the reflective liquid crystal display element 12 will be described.

The reflective liquid crystal display element 12 is an active matrix type and uses liquid crystal in a mode employing a polarizing plate, e.g., TN liquid crystal having, for example, 45° twisted orientation. The structure of the reflective liquid crystal display element 12 is shown in FIG. 2a. The reflective liquid crystal display element 12 includes a transparent substrate 17, an active matrix substrate 18, and liquid crystal 19. The transparent substrate 17 and the active matrix substrate 18 are disposed so as the face each other. On the active matrix substrate 18, there is an light reflection panel for reflecting light which is incident thereupon through the transparent substrate 17. One common electrode is formed over almost the entire surface of the transparent substrate 17, which faces the active matrix substrate 18, and a plurality of display electrodes are formed in a matrix on the surface of the active matrix substrate 18, which faces the transparent substrate 17. Regions where the common electrode and the display electrodes overlap each other become display regions (pixels).

In the reflective liquid crystal display elements 12 and 12', a driving voltage is applied between the common electrode and the display electrodes by the driving circuits 14 which are connected to the reflective liquid crystal display elements 12 and 12', respectively, whereby a predetermined display is performed. The display control signal transmitted from the display control circuit 16 which is common to the reflective liquid crystal display elements 12 and 12' regulates the driving circuits 14.

Figure 5:
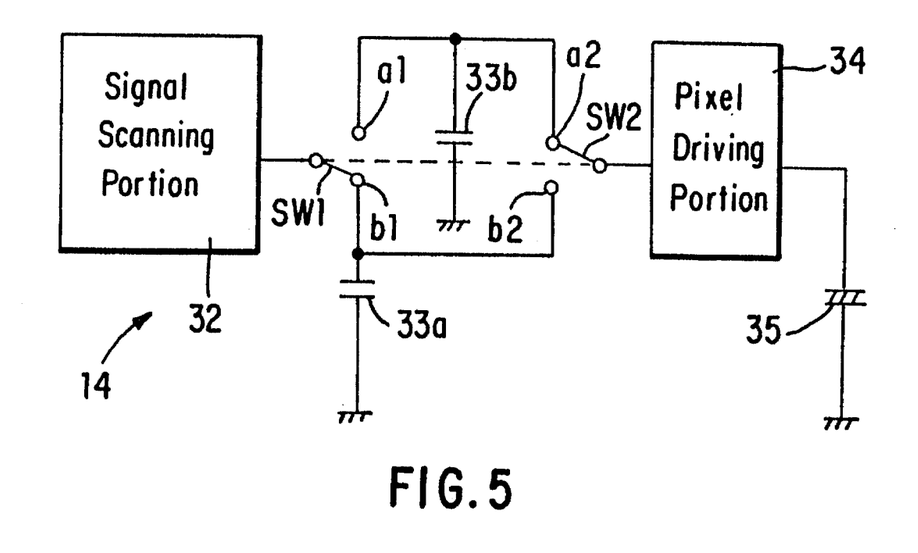
FIG. 5 is a block diagram showing a driving circuit.

Each driving circuit 14 writes a driving signal for a subsequent image, while a desired display is performed by the reflective liquid crystal display element 12 or 12'. FIG. 5 shows a structure of the driving circuit 14. The driving circuit 14 has a signal scanning portion 32 regulated with a display control signal; capacitors 33a and 33b for storing a driving signal from the signal scanning portion 32; a switch $SW_1$, by which the driving signal from the signal scanning portion 32 is switched to be supplied to the capacitor 33a or 33b; and a switch $SW_2$, by which the driving signal stored at the capacitor 33a or 33b is switched to be supplied to a pixel driving portion 34. The driving circuit 14 is partially or entirely built in the active matrix substrate 18.

In the case of a three-dimensional display, the display control circuit 16 transmits per frame an image signal for a left eye to one driving circuit 14, and an image signal for a right eye to the other driving circuit 14. These image signals for right and left eyes respectively include image signals having red, green, and blue components per frame. Moreover, the display control circuit 16 transmits switching signals to the signal scanning portion 32 so as to be given to the $SW_1$ and $SW_2$ per frame and each image signal with red, green, and blue components. The switching signals are also given to the switching circuits 30C, 30M, and 30Y of the light selection unit 13.

The driving circuit 14 functions as follows:

While each liquid crystal (pixel) 35 is driven by the driving signal stored in the capacitor 33b, a driving signal for a subsequent image, which is transmitted through the signal scanning portion 32 and the switch $SW_1$, is stored in the capacitor 33a. Such an operation is conducted with respect to each pixel. A driving signal for a subsequent image to be displayed by each pixel is taken in the capacitor 33a of the driving circuits 14. After the driving signal is taken in the reflective liquid crystal display elements 12 and 12', or the driving circuits 14, the switch $SW_1$ provided so as to correspond to each pixel is switched from a terminal $b_1$ to a terminal $a_1$ at appropriate timing; and the switch $SW_2$ is switched from a terminal $a_2$ to a terminal $b_2$. Because of the switching of the switches $SW_1$ and $SW_2$, display image of the reflective liquid crystal display elements 12 and 12' are immediately changed into subsequent images. More specifically, each liquid crystal 35 is driven by the driving signal stored in the capacitor 33a. During this time, a driving signal for a further subsequent image is stored in the capacitor 33b, whereby the driving signal is taken in the reflective liquid crystal display elements 12 and 12' or the driving circuits 14. Then, the above-mentioned operation is repeated.

Figure 6:
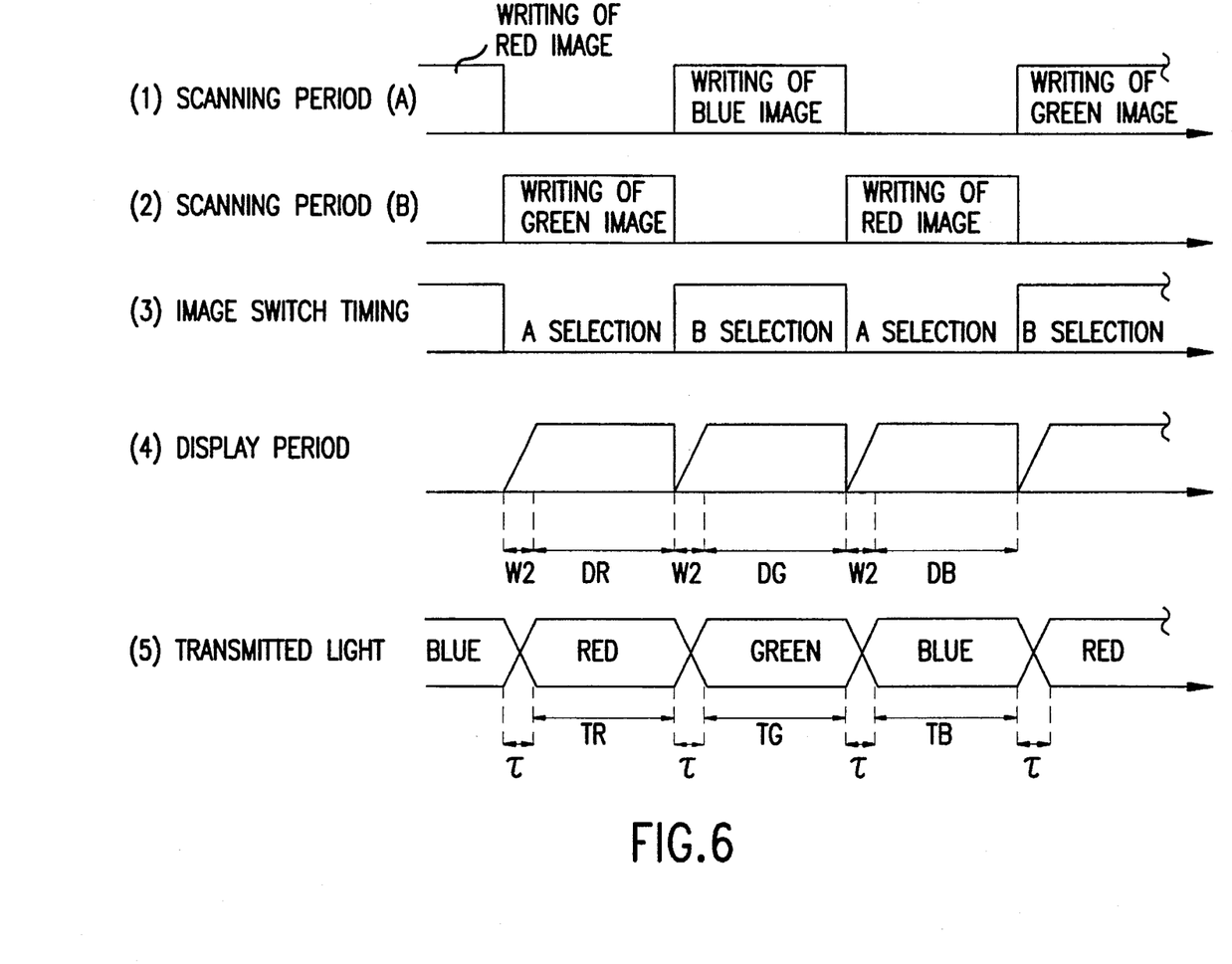
FIG. 6 is a timing chart regarding a scanning time, etc. together with the kind of transmitted light.

When the above-mentioned operation is conducted, the switch timing of a display image, i.e., switch timing of the switches $SW_1$ and $SW_2$ is synchronized with the color-change timing of the light selection unit 13, whereby a color display of images for right and left eyes is made possible. A period $W_2$ shown in FIG. 6 corresponds to a response characteristic of a display mode applied to the reflective liquid crystal display element 12, and it is preferred that the period $W_2$ is as short as possible.

In the light selection unit 13, it is possible to avoid mixing two colors (i.e., blue and red, red and green, green and blue) by taking appropriate timing to apply each voltage to the cyan filter 29C, the magenta filter 29M, and the yellow filter 29Y. Owing to the appropriate timing to apply to each voltage, timing to start a period $W_2$ shown in FIG. 6 can properly be designed.

Moreover, in the reflective liquid crystal display elements 12 and 12', there is a problem of light reflection on some portions other than the light reflection panel (e.g., the surface of the transparent substrate 17, the surface of the transparent electrode, and interfaces between various thin films (not shown) formed between the transparent substrate 17 and the active matrix substrate 18); however, the formation of anti-reflection films on these portions overcomes this problem and is useful for enhancing contrast characteristics.

Furthermore, there is a problem of response characteristics for each liquid crystal element. Since the lowest limit of frequency at which human eyes do not see a flickering of a display is about 30 Hz, in the present example, the allowable time for a display corresponding to each color (red, blue, and green) is about 10 msec. In order to perform an adequate display within 10 msec, it is required that the response time of the reflective liquid crystal display element 12 be several msec or less. In order to display each color for a plurality of times during one frame period, a liquid crystal element which has a short response time is required. Moreover, in the case where the light selection unit 13 formed of filters of each color including a liquid crystal element is used, as in the present example, the same response characteristics as those of the reflective liquid crystal display element 12 are required in the liquid crystal element of the light selection unit 13.

The inventors of the present invention studied various liquid crystal display elements in view of the above-mentioned response characteristics. As a result, it was found that a phase transition mode to which a dichroic dye is added, a polymer dispersion type liquid crystal display mode, a high-speed response type TN mode (e.g., two-frequency type liquid crystal), homogenous nematic liquid crystal mode, a ferroelectric liquid crystal display mode, and an antiferroelectric liquid crystal display mode are preferred as a liquid crystal display mode.

An example of a method for manufacturing a liquid crystal display element using a polymer dispersion type liquid crystal display mode will be described.

A diacrylate oligomer and a photopolymerization initiator are dissolved in nematic liquid crystal E7 of cyanobiphenyl type to obtain a homogeneous solution with liquid crystal concentration of 95% by weight. Separately, a polyimide film is formed on a glass substrate with a transparent electrode and is subjected to rubbing so that a pretilt angle of nematic liquid crystal is almost 2°. The solution obtained is inserted between the glass substrate thus obtained and a polycarbonate substrate so that the liquid crystal molecules are oriented in a horizontal direction with respect to the substrate and the thickness thereof is regulated with a spacer. The cell thus obtained is irradiated with UV-rays while being applied with an AC voltage of 30 V, whereby the oligomer is polymerized. After that, the polycarbonate substrate is removed from the cell, and the liquid crystal is thoroughly dissolved in an organic solvent and then dried. Next, another glass substrate with a transparent electrode formed in the same way is attached to the above-mentioned glass substrate so as to form a panel. Liquid crystal ZLI-4788/000 (manufactured by Merck & Co., Inc.) is sealed in the panel.

In the liquid crystal display element thus obtained, the liquid crystal molecules are oriented in a vertical direction with respect to the substrate under no electrical field. Therefore, when light is incident upon the liquid crystal display element, the polarization direction of the incident light is the same as that of light which comes out of the liquid crystal element. However, when sufficient voltage is applied to the liquid crystal display element, the liquid crystal molecules are oriented in the horizontal direction with respect to the substrate. Thus, when light is incident upon the liquid crystal display element so that the orientation of the liquid crystal molecules and the polarization direction of the incident light forms an angle, the polarization direction of light which comes out of the liquid crystal display element is different from that of the incident light. The same effects can be obtained in the case where elliptically polarized light or circularly polarized light is incident upon the liquid crystal display element.

According to a conventional orientation technique using the combination of oblique evaporation and an orientation agent for realizing a homeotropic structure, there have been problems such as non-uniformity of the orientation of the liquid crystal molecules and durability of the liquid crystal display element due to evaporation. In contrast, according to the above-mentioned method, evaporation is not required, thus eliminating such problems. Moreover, according to the above-mentioned method, high-speed response characteristics of polymer dispersion type liquid crystal can be provided to the liquid crystal display element, so that there arise less problems related to response, compared with the conventional electrically controlled birefringence (ECB) mode. Furthermore, in the case where liquid crystal whose molecules are oriented in the horizontal direction under no electrical field is used, light is leaked due to rotary dispersion, resulting in a degraded contrast. In the liquid crystal display element manufactured as described above, the liquid crystal molecules are oriented in an almost vertical direction under no electrical field, so that light is hardly leaked due to rotary dispersion. Thus, a display with high contrast can be realized.

The above-mentioned liquid crystal material has negative dielectric anisotropy and its molecules are uniformly oriented in the horizontal direction with respect to the substrate when applied with an AC voltage. The beam splitter 70 is disposed so that the slope 70a and the orientation directions of liquid crystal molecules of the reflective liquid crystal display elements 12 and 12' form an angle of 45° (i.e., the polarized lights which come out of the beam splitter 70 shown in FIG. 1 cross each other), whereby a high contrast display without hysterisis can be obtained.

As described above, in the present example, light emitted from the optical source 1 is colored after passing through the light selection unit 13. After that, the light passes through the beam splitter 70 and the liquid crystal display elements 12 and 12' and returns to the beam splitter 70. At this time, image components for a right eye and a left eye are combined so as to be incident upon the lens 5. The combined image is magnified by the lens 5 and projected on the screen 6.

A viewer watches the image displayed on the screen 6, wearing the polarizing eyeglasses (not shown). The polarizing eyeglasses have a polarizing plate for a right eye and a polarizing plate for a left eye, each plate having a different polarization direction. For example, the polarizing plate for a right eye catches polarized light which comes out of the liquid crystal display element 12' (which displays an image for a right eye), and the polarizing plate for a left eye catches polarized light which comes out of the liquid crystal display element 12 (which displays an image for a left eye). Thus, by wearing the polarizing eyeglasses, the viewer can watch an object three-dimensionally.

The light emitted from the optical source 1 can be polarized by more than 0° and less than 180° instead of 90° as long as the image for a right eye and that for a left eye can readily be recognized. It is preferred that the angle is in the range of 45° to 135°.

In addition, it is also possible that a birefringent plate is disposed between the beam splitter 70 and the screen 6; and linearly polarized lights which come out of the reflective liquid crystal display elements 12 and 12' are converted into circularly polarized lights, the plane of each polarized light being rotated differently, followed by being projected on the screen 6. In this case, eyeglasses to be used have phase plates and polarizing plates. More specifically, when circularly polarized light is incident upon the eyeglasses, the circularly polarized light for a right eye and that for a left eye are respectively converted into linearly polarized lights by the phase plates of the eyeglasses, each polarization direction being different. The linearly polarized lights pass through the polarizing plates of the eyeglasses, whereby the image for a right eye is caught by a right eye and that for a left eye is caught by a left eye.

In the projection type liquid crystal display of the present example, a non-three-dimensional display can be performed in addition to the above-mentioned three-dimensional display. In the case where the non-three-dimensional display is performed, the identical images are displayed on the reflective liquid crystal display elements 12 and 12'. More specifically, the identical images are displayed on the reflective liquid crystal display elements 12 and 12' by two kinds of lights, each having different polarization direction. When the non-three-dimensional display is performed in the conventional projection type liquid crystal display as shown in FIG. 9, there arises a problem. That is, in the conventional projection type liquid crystal display, a transmission type liquid crystal panel is used in a display mode employing a polarizer, such as a TN mode, so that more than half of the amount of light is lost and the numerical aperture, with respect to the number of pixels, is decreased due to the presence of the polarizer, thus degrading the brightness of a display. In contrast, according to the projection type liquid crystal display of the present example, all of the lights emitted from the optical source can be used for displaying an image without being lost in an optical path. Moreover, the numerical aperture with respect to the number of the pixels can be improved due to the use of the reflective liquid crystal display elements 12 and 12', compared with the use of transmission type liquid crystal display elements. As a result, a remarkably bright display can be performed.

Furthermore, in the conventional projection type liquid crystal display, it is required to use three liquid crystal elements. In contrast, in the projection type liquid crystal display according to the present invention, two liquid crystal display elements are used. For this reason, the present invention has advantages of size, weight, and cost.

As described above, both the three-dimensional display and non-three-dimensional display can be performed in the projection type liquid crystal display of the present invention. In the case where the non-three-dimensional display is performed in this projection type liquid crystal display, almost all of the lights which are incident upon the beam splitter 70 can come out thereof as lights having image information, and thus, a bright image can be displayed on the screen 6. In addition, because of the use of the reflective liquid crystal display elements 12 and 12', the formation of an image is not adversely influenced by geomagnetism. Moreover, a color display is readily performed by disposing the light selection unit 13 on the light incidence side of the reflective liquid crystal display elements 12 and 12' or on the light outgoing side thereof. An image is projected on a screen, so that there is no limit to the visual field and a number of people can watch the image together. Furthermore, the use of the above-mentioned liquid crystal can prevent flickering, leading to improved resolution. The improved resolution can realize the miniaturization of the three-dimensional display system.

As Tn liquid crystal having a 45° twisted orientation which is used for the liquid crystal display elements 12 and 12', the usual nematic liquid crystal is applicable. In order to obtain the high speed of the response, it is required to consider the viscosity of the material. In general, liquid crystal with a size of 35 centipoises (cp) or less exhibits effects for realizing the present invention. From experience, the inventors of the present invention found that liquid crystal with a size of 25 cp or less is preferred. Examples of the material exhibiting such characteristics include biphenyl compounds, phenylester compounds, cyclohexane compounds, phenylpyrimidine compounds, dioxane compounds, diphenylacetylene compounds, alkenyl compounds, fluorine compounds, and mixtures thereof. The twisted angle of liquid crystal is not limited to 45°. Moreover, as a display mode, any modes which use polarized light can be used. Examples of the display mode include a TN mode, a phase transition mode, a guest-host mode, a polymer dispersion type liquid crystal display mode, a ferroelectric liquid crystal display mode, an antiferroelectric liquid crystal display mode, and an electroclinic liquid crystal display mode.

In the present example, the light selection unit 13 is used for performing a color display. In place of that, a color display is also made possible in a structure in which a color microfilter is provided on each pixel by dyeing, electrodeposition, printing, etc. In this case, instead of successively displaying red, green, and blue components by the liquid crystal display elements 12 and 12' while an image for a right eye or an image for a left eye is projected on the screen 6, a color signal corresponding to each pixel is simultaneously transmitted while the image for a right eye or the image for a left eye is projected on the screen 6. Thus, in the system using a color microfilter, the response speed required for the reflective liquid crystal display elements 12 and 12' can be three times slower than that in the case where the light selection unit 13 is used as in the present example. Accordingly, as to the display mode and the liquid crystal material, wide selection is made possible because of the reduced limitation of the response speed.

Figure 7:
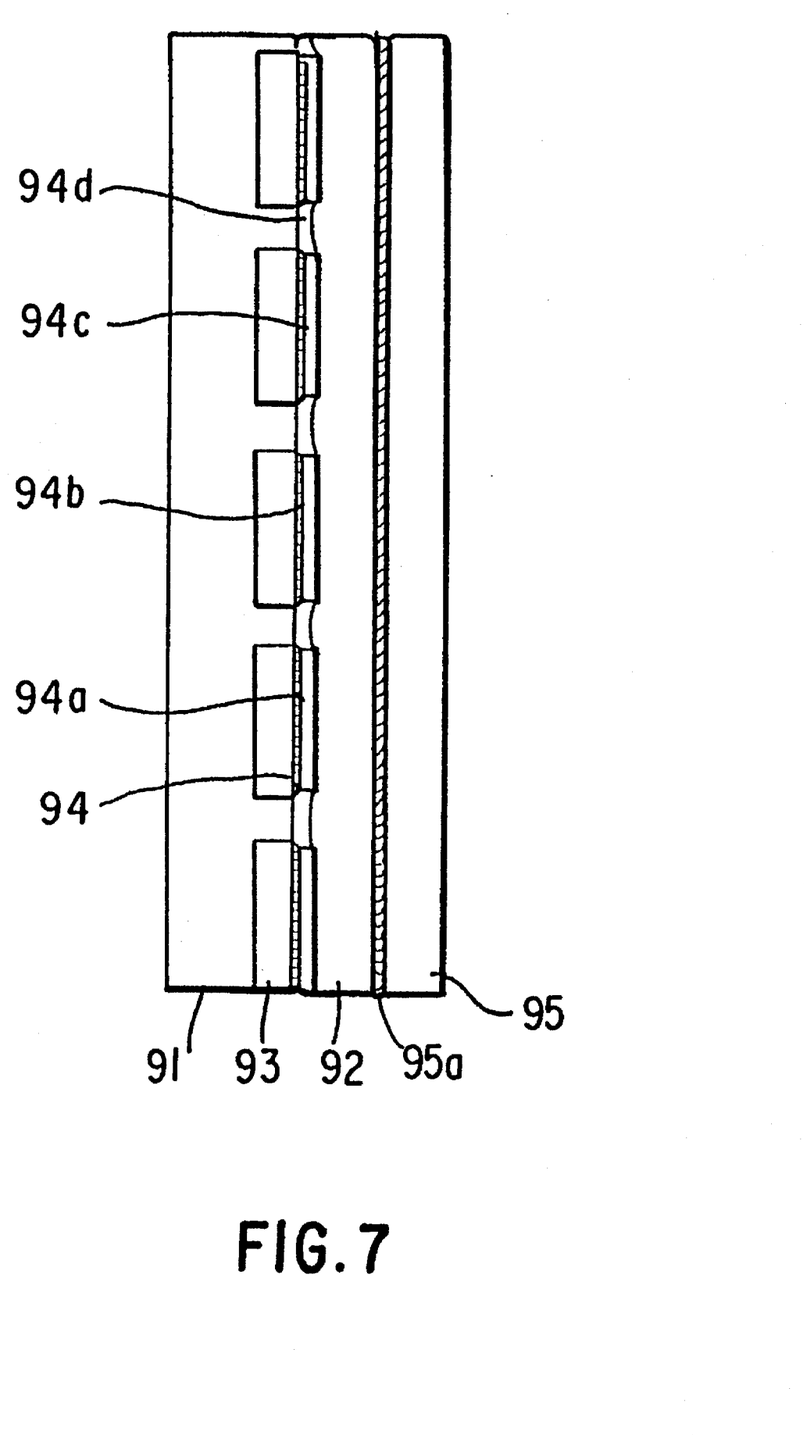
FIG. 7 is a cross-sectional view showing a liquid crystal display element in which a color filter is integrated.

As the substrate 18, a substrate made of glass or crystal such as silicon is used. On such a substrate, non-linear elements such as a thin film transistor (TFT) or a diode are formed, and the elements are formed of amorphous silicon and/or polysilicon. In particular, a crystal substrate is desired, since the driving circuit (a memory circuit for storing a signal) 14 can readily be provided behind each pixel. FIG. 7 shows a reflective liquid crystal display element having a color microfilter and a silicon substrate. In FIG. 7, switching circuit and memory circuit regions 93 of liquid crystal 92 are formed on a monocrystalline silicon substrate 91. Here, three switching circuit regions 93 are formed as one group. Each electrode 94 which also functions as a reflective film is formed on each switching circuit and memory circuit region 93, and under this condition, a gelatin film is formed over the entire surface of the monocrystalline silicon substrate 91. Each upper portion of the gelatin film, which corresponds to the respective three switching circuit and memory circuit regions 93 as one group of pixels is dyed in red, green, and blue. The respective colored portions are made of a red color filter 94a, a green color filter 94b, and a blue color filter 94c, and the remaining portions are left as the gelatin film (undyed region 94d). In FIG. 7, the reference numeral 95 denotes a transparent glass substrate provided so as to face the silicon substrate 91, and the reference numeral 95a denotes a transparent counter electrode formed over the entire inner surface of the substrate 95.

Figure 8:
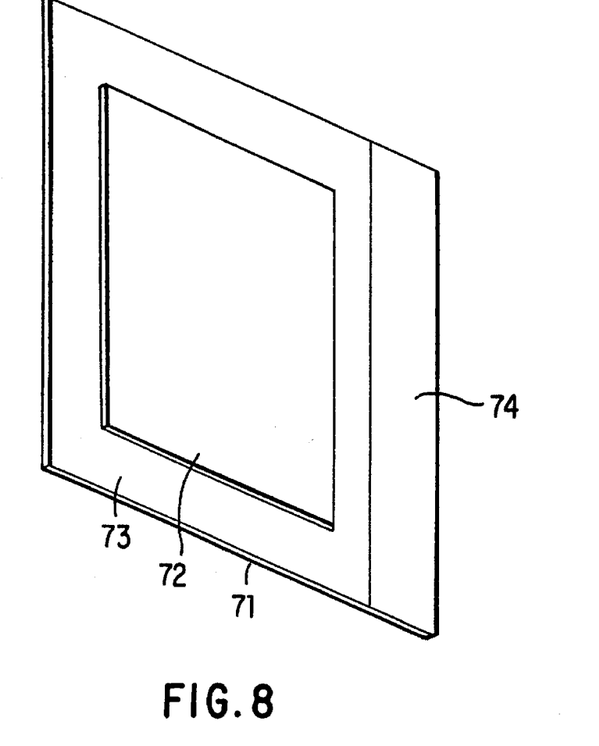
FIG. 8 is a perspective view showing a liquid crystal display element in which a frame memory is provided.

Moreover, the liquid crystal display elements 12 and 12' can have a structure in which a frame memory is built as shown in FIG. 8. More specifically, a liquid crystal display portion 72 is formed at the center region on a monocrystalline silicon substrate 71 (base), and at the periphery of the liquid crystal display portion 72, a liquid crystal driving circuit 73, a circuit portion 74 including a memory circuit, an image processing circuit, and the like are formed. An input signal is processed in the circuit portion 74, and is transferred to the liquid crystal driving circuit 73, whereby an image is displayed on the liquid crystal display portion 72.

In the case where a liquid crystal display element of this type is used, since the monocrystalline silicon substrate is used, an IC technique is applicable. That is, a microprocessing technique, a method for forming a high quality thin film, a method for implanting impurities with high precision, etc. can be used. In addition, because of the application of these methods, the advantages of achieving high precision, high speed operation, and high reliability are realized.

As described above, according to the present invention, almost all of the lights which are incident upon the optical member such as the beam splitter, mirror, or the like (which divides non-polarized light into two kinds of polarized lights, each having a different polarization direction) can be taken out as light having image information for right and left eyes or as light having single image information. Thus, a bright image without flickering can be displayed three-dimensionally or non-three-dimensionally. In addition, a color display can be performed by providing the light selection unit, the color filter, or the mechanical R.G.B. rotary filter on the side of the liquid crystal display element. Moreover, resolution can be improved by using a memory circuit and applying an IC microprocessing technique.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type liquid crystal display comprising:

an optical source for generating light;

a light dividing means which divides the light into a first light having a first polarization direction and a second light having a second polarization direction, and allows the first and second lights to come out in different directions from each other;

a pair of reflective liquid crystal display elements formed of a first reflective liquid crystal display element and a second reflective liquid crystal display element, each of the pair of reflective liquid crystal display elements including a pair of substrates facing each other and liquid crystal sealed between the pair of substrates, the first reflective liquid crystal display element changing the first polarization direction of the first light by the liquid crystal sealed therein to allow the first light to come out thereof, and the second reflective liquid crystal display element changing the second polarization direction of the second light by the liquid crystal sealed therein to allow the second light to come out thereof;

a driving means for driving the first reflective liquid crystal display element and the second reflective liquid crystal display element with synchronization;

a light synthesizing means for receiving the first light which comes out of the first reflective liquid crystal display element and the second light which comes out of the second reflective liquid crystal display element, and synthesizing the first and second lights into image light; and a screen on which the image light is displayed.

2. A projection type liquid crystal display according to claim 1, wherein the light synthesizing means also functions as the light dividing means.

3. A projection type liquid crystal display according to claim 1, wherein the light dividing means is a beam splitter.

4. A projection type liquid crystal display according to claim 1, further comprising a light selection means for converting the light from the optical source into either one of a red light, a green light, and a blue light.

5. A projection type liquid crystal display according to claim 4, wherein the light selection means is formed of a cyan filter, a magenta filter, and a yellow filter.

6. A projection type liquid crystal display according to claim 5, wherein the cyan filter, the magenta filter, and the yellow filter have a pair of transparent substrates facing each other and liquid crystal sealed between the pair of transparent substrates, respectively.

7. A projection type liquid crystal display according to claim 4, wherein the light selection means is a mechanical R.G.B. rotary filter.

8. A projection type liquid crystal display according to claim 1, wherein the first liquid crystal display element and the second liquid crystal display element have a plurality of pixels and color filters formed on each pixel, respectively.

9. A projection type liquid crystal display according to claim 1, wherein at least one of the pair of substrates is a transparent substrate, and the first light or the second light are incident upon the transparent substrate.

10. A projection type liquid crystal display according to claim 9, wherein the pair of reflective liquid crystal display elements further have a reflection means and a non-reflection means, the reflection means is formed facing the transparent substrate and reflects the first light or the second light, and the non-reflection means is formed on the side of the transparent substrate upon which the first light or the second light is incident.

11. A projection type liquid crystal display according to claim 1, wherein one substrate of the pair of substrates is a silicon substrate, and the driving means is formed on the silicon substrate.

12. A projection type liquid crystal display according to claim 11, wherein the pair of reflective liquid crystal display elements have a plurality of pixels, respectively, and the driving means is formed on a back face of the plurality of pixels.

13. A projection type liquid crystal display according to claim 11, wherein the pair of reflective liquid crystal display elements have a display portion formed of the plurality of pixels and the driving means is formed in the periphery of the display portion.

14. A projection type liquid crystal display according to claim 1, wherein an angle formed by the first polarization direction and the second polarization direction is in the range of 45° to 135°.

15. A projection type liquid crystal display according to claim 1, wherein the first light having the first polarization direction is an S-polarized light, the second light having the second polarization direction is a P-polarized light, and the liquid crystal converts the S-polarized light into light having a P-polarized component and the P-polarized light into light having an S-polarized component.

16. A projection type liquid crystal display according to claim 4, wherein the light selection means is driven to selectively convert the light from the optical source into ones of the red light, the green light, and the blue light in a time divisional manner.

17. A projection type liquid crystal display according to claim 5, wherein the cyan filter, the magenta filter and the yellow filter are selectively driven to convert the light from the optical source into selected ones of the red light, the green light, and the blue light in a time divisional manner.

18. A projection type liquid crystal display according to claim 1, wherein the display can perform a non-three-dimensional display.

19. A projection type liquid crystal display according to claim 15, wherein the display can perform a non-three-dimensional display using both the P-polarized component and the S-polarized component.

20. A projection type liquid crystal display according to claim 1, wherein the display does not include a cathode ray tube in addition to the optical source.

* * * * *